United States Patent
Hyun et al.

(10) Patent No.: US 10,432,865 B2
(45) Date of Patent: Oct. 1, 2019

(54) DIGITAL PHOTOGRAPHING APPARATUS AND CONTROL METHOD

(71) Applicant: SAMSUNG ELECTRO-MECHANICS CO., LTD., Suwon-si (KR)

(72) Inventors: Hae Seung Hyun, Suwon-si (KR); Hee Bum Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/061,245

(22) Filed: Mar. 4, 2016

(65) Prior Publication Data

US 2016/0301874 A1    Oct. 13, 2016

(30) Foreign Application Priority Data

Apr. 8, 2015 (KR) .................. 10-2015-0049749

(51) Int. Cl.
  *H04N 5/232*  (2006.01)

(52) U.S. Cl.
  CPC ..... *H04N 5/23287* (2013.01); *H04N 5/23258* (2013.01)

(58) Field of Classification Search
  CPC ........... H04N 5/23287; H04N 5/23258; H04N 5/23296
  See application file for complete search history.

(56) References Cited

U.S. PATENT DOCUMENTS

| | | | | |
|---|---|---|---|---|
| 8,368,765 B2* | 2/2013 | Yeom | ....................... | G03B 5/00 348/208.2 |
| 9,300,874 B1* | 3/2016 | Lu | ....................... | H04N 5/23287 |
| 2006/0171694 A1 | 8/2006 | Kamimura et al. | | |
| 2007/0176598 A1* | 8/2007 | Thomas | ................... | G01F 23/38 324/207.25 |
| 2008/0013933 A1 | 1/2008 | Uenaka | | |
| 2008/0260367 A1 | 10/2008 | Yeom et al. | | |
| 2009/0180769 A1* | 7/2009 | Mizuta | ................... | G03B 17/00 396/55 |

(Continued)

FOREIGN PATENT DOCUMENTS

| CN | 1816111 A | 8/2006 |
|---|---|---|
| CN | 101106649 A | 1/2008 |

(Continued)

OTHER PUBLICATIONS

Chinese Office Action dated Jul. 25, 2018 in corresponding Chinese Patent Application No. 201610204022.9 (7 pages in English, 6 in Chinese).

*Primary Examiner* — Twyler L Haskins
*Assistant Examiner* — Tuan H Le
(74) *Attorney, Agent, or Firm* — NSIP Law (57) ABSTRACT

A digital photographing apparatus and method are disclosed, The digital photographing apparatus includes a position sensor configured to detect position information of a lens unit, and an optical driving processor configured to calculate a movement position variation of the lens unit based on the position information of the lens unit, compare the movement position variation with a reference movement position variation, and cause the movement position variation to converge on the reference movement position variation.

20 Claims, 4 Drawing Sheets

(56) References Cited

U.S. PATENT DOCUMENTS

| | | | |
|---|---|---|---|
| 2009/0190910 A1* | 7/2009 | Yasuda | G02B 7/38 |
| | | | 396/133 |
| 2010/0182490 A1* | 7/2010 | Seol | G02B 7/08 |
| | | | 348/345 |
| 2010/0201301 A1 | 8/2010 | Lyden et al. | |
| 2010/0239237 A1 | 9/2010 | Lee et al. | |
| 2011/0013029 A1 | 1/2011 | Akutsu et al. | |
| 2012/0044369 A1* | 2/2012 | Irisawa | H04N 5/23248 |
| | | | 348/208.4 |
| 2013/0027791 A1* | 1/2013 | Asano | G02B 7/102 |
| | | | 359/824 |
| 2013/0070149 A1 | 3/2013 | Lee | |
| 2013/0293179 A1 | 11/2013 | Lee | |
| 2013/0300336 A1 | 11/2013 | Ishikawa et al. | |
| 2014/0379103 A1 | 12/2014 | Ishikawa et al. | |
| 2015/0139634 A1* | 5/2015 | Kim | H04N 5/23287 |
| | | | 396/53 |
| 2015/0153630 A1* | 6/2015 | Chen | G03B 13/36 |
| | | | 348/357 |
| 2016/0241787 A1* | 8/2016 | Sekimoto | H04N 5/2257 |
| 2016/0269637 A1* | 9/2016 | Shibata | G06T 5/20 |
| 2016/0327806 A1* | 11/2016 | Kasamatsu | G02B 27/646 |
| 2017/0219914 A1 | 8/2017 | Sekimoto | |

FOREIGN PATENT DOCUMENTS

| | | |
|---|---|---|
| CN | 101820239 A | 9/2010 |
| CN | 101957535 A | 1/2011 |
| CN | 103391044 A | 11/2013 |
| CN | 103443702 A | 12/2013 |
| CN | 104185812 A | 12/2014 |
| CN | 104967785 A | 10/2015 |
| JP | 2009-115895 A | 5/2009 |
| KR | 10-2008-0093578 A | 10/2008 |
| KR | 10-2010-0104383 A | 9/2010 |
| KR | 10-2011-0131013 A | 12/2011 |
| WO | WO 2015/178083 A1 | 11/2015 |

* cited by examiner

DIGITAL PHOTOGRAPHING APPARATUS AND CONTROL METHOD

CROSS-REFERENCE TO RELATED APPLICATION(S)

This application claims the priority and benefit under 35 USC § 119(a) of Korean Patent Application No. 10-2015-0049749, filed on Apr. 8, 2015 with the Korean Intellectual Property Office, the entire disclosure of which is incorporated herein by reference for all purposes.

BACKGROUND

1. Field

The following description relates to a digital photographing apparatus and a control method.

2. Description of Related Art

In a digital photographing apparatus, an image received through an imaging device (or an image pickup device) is processed by a digital signal processor, and the processed image is compressed to generate an image file. The image file may be stored in a memory.

The digital photographing apparatus may display an image of an image file received through an image pickup device, or an image of an image file stored in a storage medium, on a display device such as a liquid crystal display (LCD). However, when a user captures a desired image, the digital photographing apparatus such as a camera may wobble due to a movement, such as, for example, a movement of a vehicle or a handshake of the user. Such a movement may lead to shaking of an image input through the image pickup device, which results in a defective photograph.

To prevent defective photograph due to a movement, an angular velocity (rotational components of pitch and yaw), or the like, of a camera is detected by a gyro sensor, or the like, installed in a camera. When handshake or other movement occur, a driving distance of a camera lens is calculated on the basis of the detected angular velocity, and the lens is moved by the driving distance through an actuator through optical image stabilization (OIS).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a digital photographing apparatus for securing predetermined driving performance of an optical driving module in the entire section of a lens unit on the basis of current position information of the lens unit, and a control method thereof.

In another general aspect, there is provided, a digital photographing apparatus and a control method thereof to secure reliability of movement control in the entire section of the lens unit by converging a movement position variation corresponding to position information of the lens unit output from the hall sensor on the previously detected reference movement position variation.

In another general aspect, there is provided a digital photographing apparatus including a position sensor configured to detect position information of a lens unit, and an optical driving processor configured to calculate a movement position variation of the lens unit based on the position information of the lens unit, compare the movement position variation with a reference movement position variation, and cause the movement position variation to converge on the reference movement position variation.

The optical driving processor may be further configured to calculate the movement position variation of the current position information of the lens unit corresponding to previously detected movement position variations.

The digital photographing apparatus may include an optical driving module configured to move the lens unit in x axis or y axis direction, and an optical driver configured to control the optical driving module based on a control signal transmitted from the optical driving processor.

The optical driving processor may be configured to control a unit driving current applied to the optical driving module to cause the movement position variation to converge on the reference movement position variation, in response to the movement position variation being different from the reference movement position variation.

The optical driving processor may be configured to increase a magnitude of the unit driving current to cause the movement position variation to converge on the reference movement position variation, in response to the movement position variation being smaller than the corresponding reference movement position variation.

The optical driving processor may be configured to decrease a magnitude of the unit driving current to cause the movement position variation to converge on the reference movement position variation, in response to the movement position variation being greater than the corresponding reference movement position variation.

The reference movement position variation may be set to cause a movement position variation of the lens unit to be within a range from 0.1 µm to 1 µm when the unit driving current is applied to the optical driving module.

The movement position variations according to positions of the lens unit may be configured as a look-up table (LUT) or a curve in a Gaussian function form.

The position information of the lens unit may include information regarding a movement position of the lens unit and a movement direction of the lens unit.

The digital photographing apparatus may include a position sensor signal processor configured to amplify a signal output from the position sensor with a predetermined gain, to convert the amplified signal into a digital signal, and to transmit the converted digital signal to the optical driving processor.

The signal output from the position sensor may include the current position information of the lens unit.

In another general aspect, there is provided a method for controlling a digital photographing apparatus, the method including detecting a position information of a lens unit by a position sensor, calculating, at an optical driving processor, a movement position variation of the lens unit based on the position information of the lens unit, comparing the movement position variation with a reference movement position variation, and causing the movement position variation to converge on the reference movement position variation.

The comparing of the movement position variation may include controlling a unit driving current applied to an optical driving module, in response to the movement position variation being different from the reference movement position variation.

In detecting of the movement position variation, the movement position variation corresponding to current position information of the lens unit may be detected from previously detected movement position variations.

The controlling of the unit driving current may include increasing a magnitude of the unit driving current to cause the movement position variation to converge on the reference movement position variation, in response to the movement position variation being smaller than the reference movement position variation, and decreasing the magnitude of the unit driving current to cause the movement position variation to converge on the reference movement position variation, in response to the movement position variation being greater than the reference movement position variation.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The aforementioned objects, features and advantages of the present invention will become more apparent through the following detailed description with respect to the accompanying drawings. In adding reference numerals for elements in each figure, it should be noted that like reference numerals already used to denote like elements in other figures are used for elements wherever possible. Also, while terms such as "one surface", "the other surface", "first" and "second," etc., may be used to describe various components, such components must not be understood as being limited to the above terms. Contents of the description regarding any one axial direction (x or y axis) may also be applied in the same manner to any other axial direction. If the detailed description of the related art would obscure the gist of the present disclosure, the description thereof will be omitted.

A movement position variation of a lens unit described hereinafter refers to a distance by which the lens unit may move from a current position by an optical driving module when a unit driving current (for example, 0.29 mA) is applied to the optical driving module, and may be configured as a look-up table (LUT) or a curve in a Gaussian function form.

Figure 1:
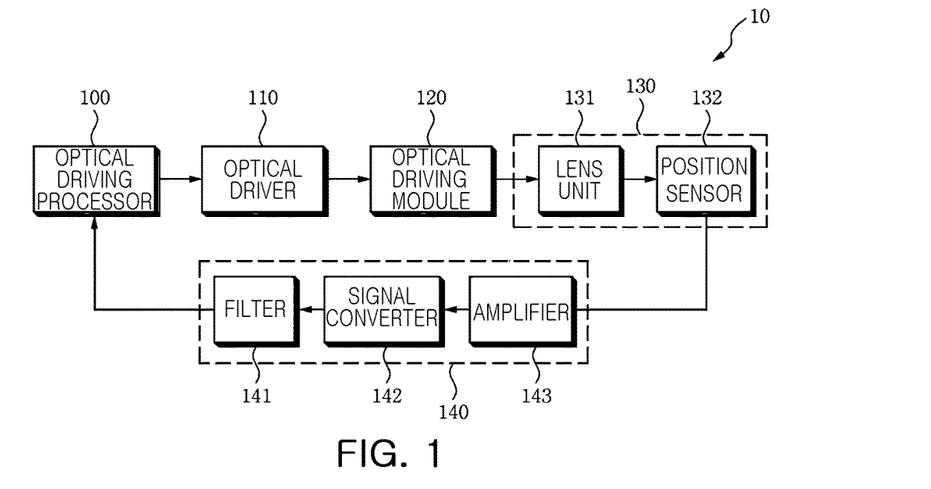
FIG. 1 is a diagram illustrating an example of a digital photographing apparatus.

FIG. 1 is a diagram illustrating an example of a digital photographing apparatus. The digital photographing apparatus may include a camera module 130, a motion sensor (not shown), an optical driving processor 100, an optical driver 110, an optical driving module 120, and a position sensor signal processor 140. The digital photographing apparatus may be realized in multi-functional mobile devices. As a non-exhaustive illustration only, a multi-functional mobile devices described herein may refer to devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, or any other consumer electronics/information technology(CE/IT) device, or any other device capable of wireless communication or network communication consistent with that disclosed herein.

The motion sensor (not shown) may be provided internally or externally from the camera module 130, and may include sensors, such as, for example, an angular velocity sensor outputting motion data corresponding to a movement of the camera module 130 and sensing a change in a rotational component (angular velocity) of the camera module due to a movement such as, hand shaking, and an accelerometer sensing a change in a linear component (speed) according to a movement of the camera module 130 in a vertical or horizontal direction.

The angular velocity sensor may be a gyro sensor able to sense a change in an angular velocity of a movement in two directions of yaw axis and pitch axis to compensate for a shaking of the hand with respect to upper and lower portions and left and right portions of the camera module 130. The accelerometer may sense a change in a speed in a horizontal (x axis) and vertical (y axis) direction of the camera module 130. The accelerometer corresponds to a linear component based on a movement of the camera module 130.

In an example, as shown in FIG. 1, camera module 130 may include a lens unit 131 and a position sensor 132. The lens unit 131 may include a lens barrel (not shown) and a lens group (not shown). The lens barrel may include an image sensor (not shown) optically processing light from a subject to detect an image frame of an image (still image or video) of the subject. The position sensor 132 may sense a change in a position of the lens barrel. In an example, the lens unit 131 may include a zoom lens, a focus lens, or a compensation lens, and the image sensor may be a charge coupled device (CCD) or a complementary metal-oxide semiconductor (CMOS) converting an optical signal incident through the lens barrel into an electrical analog signal.

The position sensor 132 senses a change in a position of the lens unit 131 and transmits current position information of the lens unit 131 to the optical driving processor 100 through the position sensor signal processor 140. In an example, the position sensor 132 may be a hall sensor 132 detecting current position information of the lens unit 131 by using the Hall effect that a voltage is changed according to strength of a magnetic field, and position information of the lens unit 131 may include information regarding a movement position and a movement direction of the lens unit 131.

The position sensor signal processor 140 is configured to amplify a signal including current position information of the lens unit 131 output from the position sensor 132 with a predetermined gain, convert the amplified signal into a digital signal, and transmit the converted digital signal to the optical driving processor 100. The position sensor signal processor 140 may include an amplifier 143 amplifying a sensing signal output from the position sensor 132 with a preset gain, a signal converter 142 converting the amplified sensing signal into a digital signal, and a filter 141 canceling noise from the sensing signal, which has been converted into a digital signal.

The optical driver 110 controls a range of movement of the lens unit 141 by controlling a driving current applied to the optical driving module 120 through a switching operation corresponding to a control signal input from the optical driving processor 100. In an example, the optical driver 110 may be a motor driving integrated circuit (IC), but is not limited thereto.

The optical driver 110 includes a signal converter (IDAC) converting a digital control signal (bit) applied from the optical driving processor 100 into a current (DC) form and a switching circuit (for example, a semiconductor device such as, for example, a metal oxide semiconductor field effect transistor (MOSFET)) for the switching operation.

In an example, the optical driving module 120 may be first and second actuators (not shown) including a voice coil motor (VCM) or a piezoelectric device. The first actuator (not shown) controls a movement of the lens unit 141 in a vertical direction (y-axis direction) and the second actuator (not shown) controls a movement of the lens unit 141 in a horizontal direction (x-axis direction).

The optical driving processor 100 compares a movement position variation of the lens unit 131 corresponding to position information of the lens unit 131 with a reference movement position variation and sends control signals to converge the movement position variation of the lens unit 131 on the reference movement position variation.

The optical driving processor 100 calculates a movement position variation of the lens unit 131 corresponding to current position information of the lens unit 131. The optical driving processor 100 compares the calculated movement position variation of the lens unit 131 with movement position variations according to respective positions of the lens unit 131. When the calculated movement position variation is different from the reference movement position variation, the optical driving processor 100 controls a unit driving current applied to the optical driving module 120 to control the movement position variation to be converged on the reference movement position variation.

When the movement position variation corresponding to the position information of the lens unit 131 is smaller than the reference movement position variation, the optical driving processor 100 increases a magnitude of the unit driving current and controls the movement position variation to be converged on the reference movement position variation.

When the movement position variation corresponding to the position information of the lens unit 131 is greater than the reference movement position variation, the optical driving processor 100 decreases the magnitude of the unit driving current and controls the movement position variation to be converged on the reference movement position variation.

In an example, the reference movement position variation may be set in such a manner that the movement position variation of the lens unit 131 is determined within a range from 0.1 μm to 1 μm when the unit driving current is applied, but is not limited thereto.

The optical driving processor 100 described above may be realized in a hardware, such as, for example, a semiconductor chip or an application-specific integrated circuit (ASIC), which includes an algorithm for performing the function described above.).

A method for controlling a digital photographing apparatus will be described with reference to FIGS. 2 through 6.

Figure 2:
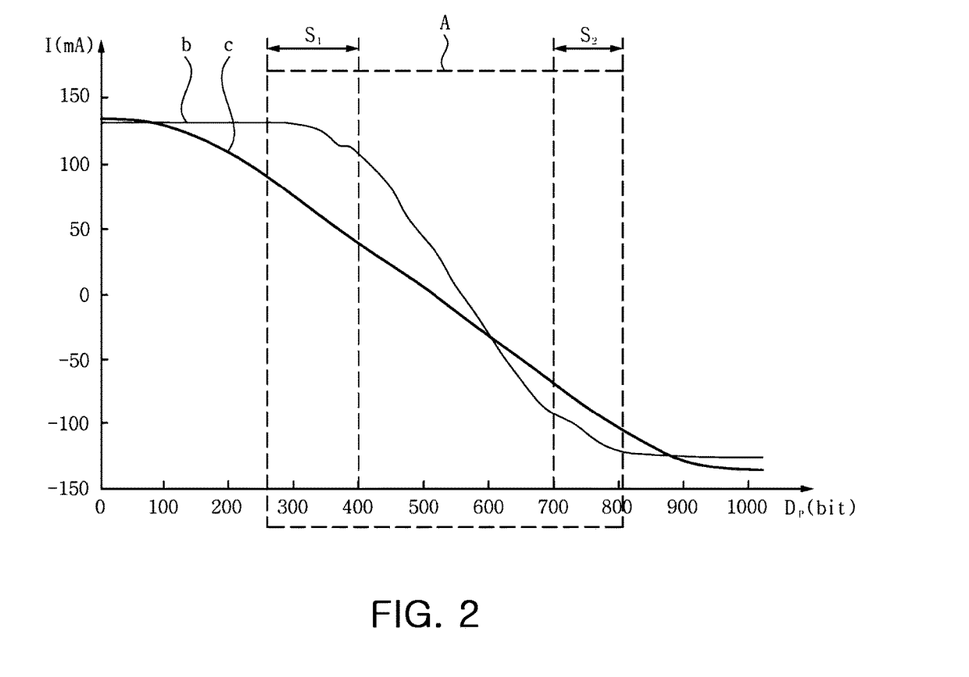
FIG. 2 is a diagram illustrating an example of a movement displacement of a lens unit according to a driving current.
Figure 3:
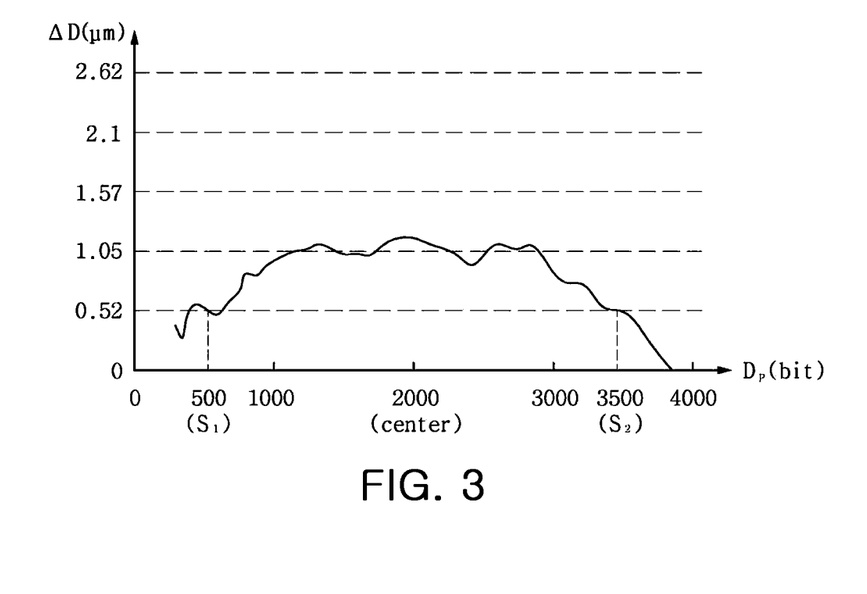
FIG. 3 is a diagram illustrating an example of a movement position variation corresponding to position information of a lens unit.
Figure 4:
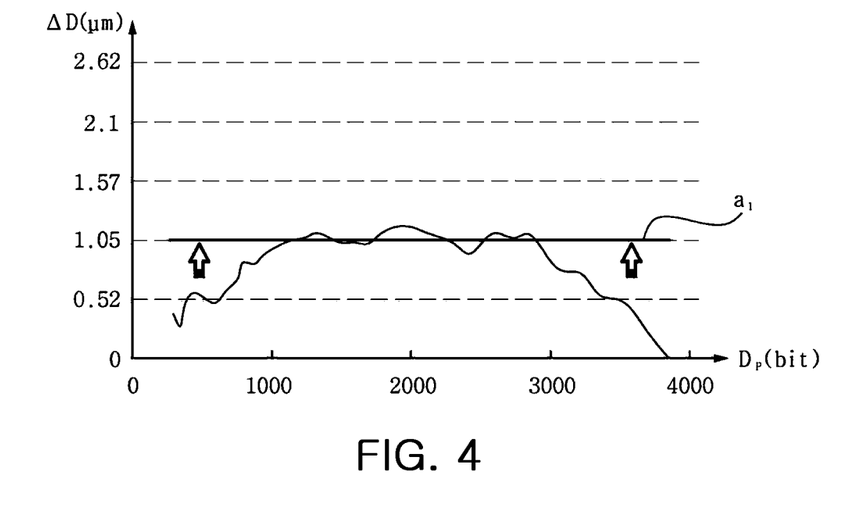
FIGS. 4 and 5 are diagrams illustrating examples of converging a movement position variation corresponding to position information of a lens unit on a reference movement position variation.
Figure 5:
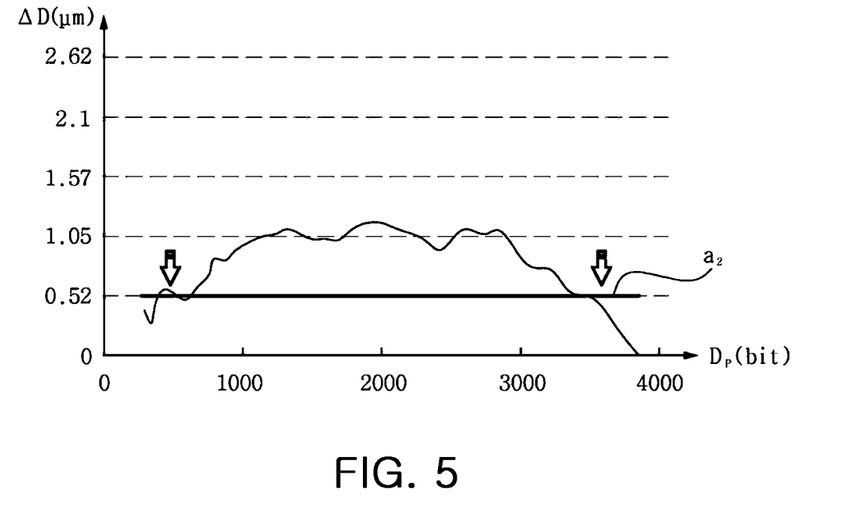
Figure 6:
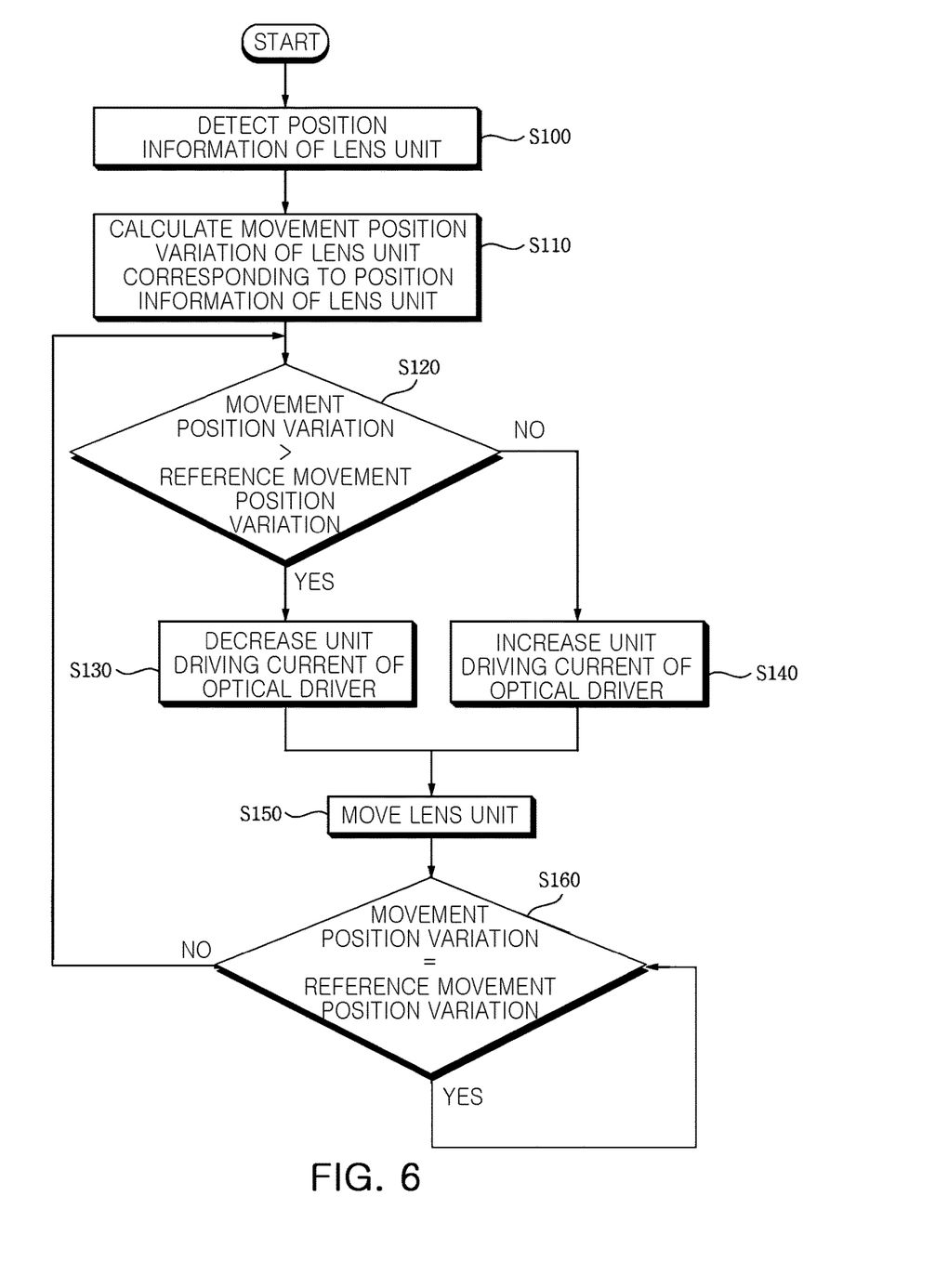
FIG. 6 is a diagram illustrating an example of a method for controlling a digital photographing apparatus.

FIG. 2 is a diagram illustrating an example of a movement displacement of a lens unit according to a driving current. FIG. 3 is a diagram illustrating an example of a movement position variation corresponding to position information of a lens unit. FIGS. 4 and 5 are diagrams illustrating examples of converging a movement position variation corresponding to position information of a lens unit on a reference movement position variation. FIG. 6 is a diagram illustrating an example of a method for controlling a digital photographing apparatus.

In FIG. 2, $D_p$ denotes an output signal of the hall sensor 132 corresponding to a current position of the lens unit 131, and I denotes the driving current in mA, which is applied to the optical driving module 120. In an example, $D_p$ is determined by bits of the hall sensor 132. As illustrated in FIG. 2, line c shows that a movement distance of the lens unit 131 is linearly increased within a driving range (A) of the optical driving module 120, in proportion to a driving current I (shown by line b) applied to the optical driving module 120. However, at a side area ($S_1$ or $S_2$), the movement distance of the lens unit 131 is not linearly proportional to the driving current I due to electrical or mechanical influence.

Thus, as illustrated in FIG. 3, in the digital photographing apparatus, movement position variations ΔD in all positions $D_p$ of the lens unit 131 are detected by continuously applying a unit driving current to the optical driving module 120 during a calibration operation (sweep driving). The movement position variations ΔD may be expressed as an LUT or a Gaussian function form, and may be stored within the optical driving processor 100 or in a separate memory (not shown).

The reference movement position variation of the lens unit 131 refers to an ideal movement position variation ΔD at every position of the ideal lens unit 131 with respect to a unit driving current applied to the optical driving module 120, and may be expressed as a constant.

When the movement position variation ΔD is different from the reference movement position variation $a_1$, the optical driving processor 100 controls the unit driving current applied to the optical driver 110 to cause the movement position variation ΔD to converge on the reference movement position variation $a_1$.

As illustrated in FIG. 4, the reference movement position variation $a_1$ is set to a high point (approximately 1.05 μm (output value of hall sensor=approximately 10)) of the movement position variation curve (Gaussian function form) of the lens unit 131. In FIG. 4, a movement position variation ΔD corresponding to current position information ($D_p$ for a section from about 500 to about 1000, and a section from about 3000 to about 4000) of the lens unit 131 is smaller than the reference movement position variation $a_1$. In such a case, the optical driving processor 100 increases a magnitude of the unit driving current (approximately 0.29 mA) applied to the optical driving module to cause the movement position variation ΔD corresponding to the current position information of the lens unit 131 to converge on the reference movement position variation $a_1$.

The optical driving processor 100 may increase the magnitude of the unit driving current applied to the optical driving module 120 to cause the movement position variation ΔD corresponding to the current position information of the lens unit 131 to converge on the reference movement position variation $a_1$. In an example, the optical driving processor 100 may increase the magnitude of the unit driving current in a software aspect. In another example, the optical driving processor 100 may increase the magnitude of the unit driving current in a hardware aspect.

When the movement position variation ΔD corresponding to the current position information of the lens unit 131 approximates (is larger or smaller than) the reference movement position variation $a_1$, it may be considered that the movement position variation ΔD converges on the reference movement position variation $a_1$.

As illustrated in FIG. 5 a reference movement position variation $a_2$ is set to a low point (approximately 0.52 μm) of the movement position variation curve (Gaussian function form) of the lens unit 131.

When a movement position variation ΔD corresponding to current position information of the lens unit 131 is greater than the reference movement position variation $a_2$, the optical driving processor 100 decreases a magnitude of the unit driving current (approximately 0.29 mA) applied to the optical driving module. The decrease in the magnitude of the unit driving current applied to the optical driving module causes the movement position variation ΔD, corresponding to the current position information ($D_p$=a section from about 800 to about 3300) of the lens unit 131, to converge on the reference movement position variation $a_2$.

The section ($D_p$=about 800 to about 3300) in which the movement position variation ΔD is greater than the reference movement position variation $a_2$, the optical driving processor 100 may apply a different resolution and decrease the magnitude of the unit driving current applied to the optical driving module 120 to cause the movement position variation ΔD corresponding to the current position information of the lens unit 131 to converge on the reference movement position variation $a_2$.

The optical driving processor 100 may apply different resolution to the section ($D_p$=about 800 to about 3300) in which movement position variation ΔD is greater than the reference movement position variation $a_2$ and to the sections ($D_p$=from about 10 to about 800, or from about 3300 to about 3900) in which movement position variation ΔD is smaller than the reference movement position variation $a_2$.

For example, for the section ($D_p$=from about 10 to about 800, or from about 3300 to about 3900) in which the movement position variation ΔD is smaller than the reference movement position variation $a_2$, the optical driving processor 100 increases a unit driving current applied to the optical driving module 120 by 0.29 mA each time a control signal generated by the optical driving processor 100 is increased by 1, with respect to 10 bits (0 to 1023).

Regarding the section ($D_p$=from about 800 to about 3300) in which the movement position variation ΔD is greater than the reference movement position variation $a_2$, the optical driving processor 100 may decrease a unit driving current by 0.145 mA each time a control signal generated by the optical driving processor 100 is increased by 1, with respect to 11 bits (0 to 2048), and is not limited thereto.

When which the movement position variation ΔD corresponding to the current position information of the lens unit 131 approximates (is larger or smaller than) the reference movement position variation $a_2$, the movement position variation ΔD may be considered to converge on the reference movement position variation $a_2$.

FIG. 6 is a diagram illustrating an example of a method for controlling a digital photographing apparatus. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. The above descriptions of FIG. 1-5 is also applicable to FIG. 6, and is incorporated herein by reference. Thus, the above description may not be repeated here.

As illustrated in FIG. 6, in S100, the optical driving processor 100 detects position information of the lens unit 131 from the position sensor 132. In S110 a movement position variation corresponding to a current position of the lens unit 131 is detected from a movement position variation regarding each of detected positions of the lens unit 131. In an example, the movement position variation is calculated based on LUT or a curve in a Gaussian function form.

In S120, the optical driving processor 100 compares the detected movement position variation with a previously detected reference movement position variation. When the reference movement position variation is greater, in S140, the optical driving processor 100 increases a magnitude of a unit driving current applied to the optical driving module 120. When the reference movement position variation is smaller, in S130, the optical driving processor 100 decreases the magnitude of a unit driving current applied to the optical driving module 120.

In S150, the optical driving processor 100 applies a control signal corresponding to the unit driving current adjusted to cause the movement position variation to converge on the reference movement position variation to the optical driver 110. The optical driver 110 applies the unit driving current corresponding to the control signal to the optical driving module 120. In S160, the optical driving processor 100 verifies if the reference movement position variation is about equal to the movement position variation.

As set forth above, in the digital photographing apparatus and the control method, by converging a movement position variation corresponding to position information of the lens unit output from the position sensor on the previously detected reference movement position variation, reliability of movement control in the entire section of the lens unit may be secured.

The apparatuses, units, modules, devices, and other components illustrated that perform the operations described herein with respect to FIG. 1 are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The methods illustrated in FIG. 5 that perform the operations described herein with respect to FIG. 5 are performed by a processor or a computer as described above executing instructions or software to perform the operations described herein.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A digital photographing apparatus comprising:
a position sensor configured to detect current position information of a lens unit for a driving amount; and
an optical driving processor configured to:
calculate a movement position variation of the lens unit based on the position information of the lens unit,
compare the movement position variation with a reference movement position variation among reference movement position variations, and
cause the movement position variation to converge on the reference movement position variation by adjusting the driving amount,
wherein the reference movement position variations are constants stored in the optical driving processor or in a separate memory, and
wherein the optical driving processor is configured to apply different bit resolutions to sections of the movement position variation based on differences to the reference movement position variation.

2. The digital photographing apparatus of claim 1, further comprising:
an optical driving module configured to move the lens unit in x axis or y axis direction; and an optical driver configured to control the optical driving module based on a control signal transmitted from the optical driving processor.

3. The digital photographing apparatus of claim 2, wherein the optical driving processor is further configured to control a unit driving current applied to the optical driving module to cause the movement position variation to converge on the reference movement position variation, in response to the movement position variation being different from the reference movement position variation.

4. The digital photographing apparatus of claim 3, wherein the optical driving processor is further configured to increase a magnitude of the unit driving current to cause the movement position variation to converge on the reference movement position variation, in response to the movement position variation being smaller than the corresponding reference movement position variation.

5. The digital photographing apparatus of claim 3, wherein the optical driving processor is further configured to decrease a magnitude of the unit driving current to cause the movement position variation to converge on the reference movement position variation, in response to the movement position variation being greater than the corresponding reference movement position variation.

6. The digital photographing apparatus of claim 5, wherein the reference movement position variation is set to cause a movement position variation of the lens unit to be within a range from 0.1 μm to 1 μm when the unit driving current is applied to the optical driving module.

7. The digital photographing apparatus of claim 1, wherein reference movement position variations according to positions of the lens unit are configured as a look-up table (LUT) or a curve in a Gaussian function form.

8. The digital photographing apparatus of claim 1, wherein current position information of the lens unit comprises information regarding a movement position of the lens unit and a movement direction of the lens unit.

9. The digital photographing apparatus of claim 1, further comprising a position sensor signal processor configured to amplify a signal output from the position sensor with a predetermined gain, to convert the amplified signal into a digital signal, and to transmit the converted digital signal to the optical driving processor.

10. The digital photographing apparatus of claim 1, wherein the signal output from the position sensor comprises the current position information of the lens unit.

11. The digital photographing apparatus of claim 1, wherein the information corresponding to the changing of movement position variations of the lens unit for the different driving amounts is Gaussian movement position variation curve information.

12. The digital photographing apparatus of claim 1, wherein the information corresponding to the changing of movement position variations of the lens unit for the different driving amounts is stored in a look-up-table.

13. The digital photographing apparatus of claim 1, wherein a first bit resolution of the bit resolutions is applied to the sections of the movement position variation greater than the reference movement position variation and a second bit resolution of the bit resolutions is applied to the sections of the movement position variation smaller than the reference movement position variation.

14. The digital photographing apparatus of claim 13, wherein the first bit resolution decreases a magnitude of a unit driving current applied to an optical driving module configured to move the lens unit in x axis or y axis direction.

15. The digital photographing apparatus of claim 13, wherein the second bit resolution increases a magnitude of a unit driving current applied to an optical driving module configured to move the lens unit in x axis or y axis direction.

16. A method for controlling a digital photographing apparatus, the method comprising:
detecting a current position information of a lens unit by a position sensor for a driving amount;
calculating, at an optical driving processor, a movement position variation of the lens unit based on the position information of the lens unit;
comparing the movement position variation with a reference movement position variation among reference movement position variations; and
causing the movement position variation to converge on the reference movement position variation by adjusting the driving amount,
wherein the reference movement position variations are constants stored in the optical driving processor or in a separate memory, and
wherein the optical driving processor is configured to apply different bit resolutions to sections of the movement position variation based on difference to the reference movement position variation.

17. The method of claim 16, wherein the comparing of the movement position variation further comprises controlling a unit driving current applied to an optical driving module, in response to the movement position variation being different from the reference movement position variation.

18. The method of claim 17, wherein the controlling of the unit driving current comprises:
increasing a magnitude of the unit driving current to cause the movement position variation to converge on the reference movement position variation, in response to the movement position variation being smaller than the reference movement position variation; and
decreasing the magnitude of the unit driving current to cause the movement position variation to converge on the reference movement position variation, in response to the movement position variation being greater than the reference movement position variation.

19. The method of claim 16, wherein the information corresponding to the changing of movement position variations of the lens unit for the different driving amounts is Gaussian movement position variation curve information.

20. The method of claim 16, wherein the information corresponding to the changing of movement position variations of the lens unit for the different driving amounts is stored in a look-up-table.

* * * * *